(12) United States Patent
Splett

(10) Patent No.: US 6,343,104 B1
(45) Date of Patent: Jan. 29, 2002

(54) PROCESS AND SYSTEM FOR ALTERING THE TRANSMISSION MODE IN A MOBILE COMMUNICATION SYSTEM ACCORDING TO THE TRANSMISSION QUALITY

(75) Inventor: Armin Splett, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/180,424

(22) PCT Filed: May 22, 1997

(86) PCT No.: PCT/DE97/01030

§ 371 Date: Nov. 9, 1998

§ 102(e) Date: Nov. 9, 1998

(87) PCT Pub. No.: WO97/44926

PCT Pub. Date: Nov. 27, 1997

(30) Foreign Application Priority Data

May 23, 1996 (DE) .......................... 196 20 843

(51) Int. Cl.[7] .............................................. H04L 27/10
(52) U.S. Cl. ........................ 375/274; 375/305; 455/450
(58) Field of Search ................................ 375/274, 305, 375/336, 259, 298, 264; 455/450; 370/535

(56) References Cited

U.S. PATENT DOCUMENTS

| | | |
|---|---|---|
| 4,495,619 A | 1/1985 | Acampora |
| 4,785,450 A | 11/1988 | Bolgiano et al. |
| 4,891,806 A * | 1/1990 | Farias et al. ................. 370/503 |
| 4,939,731 A | 7/1990 | Reed et al. |
| 5,381,450 A | 1/1995 | Lane et al. |
| 5,825,828 A * | 10/1998 | Sasaki .......................... 375/298 |
| 6,132,306 A * | 10/2000 | Trompower ................ 453/11.1 |

FOREIGN PATENT DOCUMENTS

| | | |
|---|---|---|
| DE | 21 12 288 | 9/1972 |
| DE | 40 32 262 C1 | 3/1982 |
| EP | 0 317 127 A2 | 5/1989 |
| EP | 0 472 511 | 2/1992 |
| EP | 0 507 384 A2 | 10/1992 |
| EP | 0 589 709 A3 | 3/1994 |
| EP | 0 112 697 | 7/1994 |
| EP | 0 616 454 | 9/1994 |

OTHER PUBLICATIONS

M. Mouly et al, "The GSM System for Mobile Communications", (1993), International Standard Book Number: 2–9507190–0–7, pp. 249–259.

Second International Symposium on Digital Audio Broadcasting, Toronto, CA Mar. 14–17, 1994, Paul Ratliff, Ph. D., Eureka 147 digital audio Broadcasting, "The System For Mobile, Portable and Fixed Receivers", pp. 294–304.

* cited by examiner

Primary Examiner—Chi Pham
Assistant Examiner—Phuong Phu

(57) ABSTRACT

A form of modulation that is variable in terms of its number of steps is provided in a mobile communication system using a digital modulation of a modulation carrier. The number of steps of the modulation in the respective digital transmission channel is thereby adaptively matched to the respectively existing transmission conditions during operation such that a largely constant error probability is achieved in this transmission channel. The modulation method is to be preferably applied in a mobile communication system with combined time-division multiplex/frequency-division multiplex multiple access methods (TDMA/FDMA).

16 Claims, 1 Drawing Sheet

| Table | SYMBOL $w_n$ | BIT $d_i$ | BIT $d_{i+1}$ |
|---|---|---|---|
| | 0 | 0 | 0 |
| | 1 | 0 | 1 |
| | 2 | 1 | 0 |
| | 3 | 1 | 1 |

PROCESS AND SYSTEM FOR ALTERING THE TRANSMISSION MODE IN A MOBILE COMMUNICATION SYSTEM ACCORDING TO THE TRANSMISSION QUALITY

BACKGROUND OF THE INVENTION

The invention is directed to a method for the modulation of a modulation carrier and to a mobile communication system.

Mobile communication systems as digital radio systems are known, for example, from M. Mouly, M.-B. Paulet, "The GSM System for Mobile Communications", 1992. The transmission channels on a radio interface between two or more communications parties are variable in mobile communication systems and are subject to many influences, so that the quality of the transmission conditions can change fast.

For example, digital phase-shift keying modulations as described in M. Mouly, M.-B. Paulet, "The GSM System for Mobile Communications", 1992, particularly pp. 249–259, are employed for modulation.

A digital phase-shift keying (PSK) is a modulation of a modulation carrier with amplitude and frequency kept constant, whereby every characteristic state of a discrete signal corresponds to a specific phase position of the modulation carrier. The transition from one phase position to the other can be a continuous or discontinuous modification. Further, MSK (minimum shift keying) modulation is also known, this being a specific form of CPFSK modulation (continuous phase frequency shift keying). CPFSK modulation is an FSK (frequency-shift keying) modulation given phase-continuous transition between the frequencies.

MSK modulation is a CPFSK modulation with a modulation index of that yields a compromise between noise resistance and bandwidth requirement given orthogonal signals and minimum frequency boost. MSK modulation, however, requires what is sometimes an unacceptably high transmission bandwidth or yields too low a data transmission rate, which can also often not be adequately improved by the smoothed version, for example the known GMSK modulation (Gaussian minimum shift keying).

It must be said that an incomplete bandwidth utilization of the transmission channel exists in mobile communication systems wherein the signals to be transmitted are modulated on a modulation carrier with such a modulation.

Given, for example, a comparison of digital mobile radiotelephone networks in a combined time-division multiple access (TDMA)/frequency-division multiple access (FDMA) as employed, for example, in the GSM (global system for mobile communication) mobile radiotelephone system to a code-division multiple access method (CDMA), a better bandwidth utilization of the CDMA networks is often cited, whereby what is understood by bandwidth utilization is the number of channels per available bandwidth and radio cell. In practice, however, a high bandwidth utilization is difficult to realize in CDMA networks, among other things because of the required synchronization. U.S. Pat. No. 4,495,619 discloses a modulation method for a satellite communication system wherein the desired number of steps are selectable.

SUMMARY OF THE INVENTION

An object of the invention is to specify measures for increasing the bandwidth utilization in a mobile communication system.

In general terms the present invention is a method for the modulation of a modulation carrier, whereby a modulation form that is variable in view of its number of steps is provided for a digital transmission channel and the number of steps of the modulation is adaptively matched during operation to the respectively existing transmission conditions. A set of the steps in a modulation with a specific number of steps is a sub-set of the set of steps with the next-higher number of steps.

A training sequence that does not change in the adaptation of the number of steps is transmitted in the digital transmission channel.

A largely constant error probability is achieved by the adaptation of the number of steps in this transmission channel.

A time-division multiplex time slot is respectively to a plurality of transmission channels. The adaptation of the number of steps of the modulation carrier of a transmission channel matched to the transmission conditions are linked with a modification of transmission time resources of this transmission channel that are made use of such that the data transmission rate of this transmission channel remains essentially constant.

The allocation of time slots to transmission channels matched to the transmission conditions is based on a high plurality of transmission channels.

The form of modulation variable in view of its number of steps is determined such that a set of modulated modulation carriers of all possible signals (bit sequences) is a sub-set of a set with the next higher number of steps given modulation with a specific number of steps.

The present invention is also a mobile communication system for signal transmission over a radio interface between a base station and a mobile station that respectively has at least a modulator and a demodulator upon employment of a multi-step modulation of a modulation carrier. A means for the determination of the transmission conditions are provided in the base station and/or the mobile station. A form of modulation variable in view of its number of steps is provided by the modulator and the demodulator. The modulator and the demodulator adaptively match the number of steps of the modulation in the respective digital transmission channel on the radio interface to the transmission conditions respectively present during operation. The modulator is fashioned such that a set of the steps in a modulation with a specific number of steps is a sub-set of the set of steps with the next-higher number of steps.

Advantageous developments of the present invention are as follows.

With the modification of the number of steps in the respective transmission channel, a largely constant error probability that can be identified by the means for the determination of the transmission conditions is achieved by the modulator and by the demodulator.

The radio interface is fashioned according to a time-division multiplex method and/or a combined time-division multiplex/frequency-division multiplex method.

The adaptation of the number of steps of the modulation carrier of a transmission channel matched to the transmission conditions by the modulator and by the demodulator are linked with a modification of transmission time resources of this transmission channel that are made use of such that the data transmission rate of this transmission channel remains essentially constant.

The allocation of time slots to transmission channels matched to the transmission conditions is based on a high plurality of transmission channels.

The form of modulation variable in view of its number of steps is determined such that the spectral width of the transmission channel is not enlarged given modification of the number of steps.

A modification of the number of steps of the modulation of the respective digital transmission channel is linked such with a modification of the transmission power and is monitored by the means for determining the transmission conditions such that an adequate signal-to-noise ratio given a high number of steps can be achieved by a higher transmission power.

The system is a GSM or GSM-like mobile radiotelephone system. For improving the bandwidth utilization, the transmission quality is monitored at the reception side given a transmission between a mobile station and a base station. Given determination of an adequate transmission quality, a switch is made from the use of a "full rate" traffic channel to a "burst half rate" traffic channel wherein, analogous to a "half rate" traffic channel, one-half the time slots is used on average, and the payload data correspond to those of a "full rate" traffic channel due to the provision of a 4-step phase modulation instead of a 2-step phase modulation.

The 4-step phase modulation in the "burst half rate" traffic channel is designed such that the occupied bandwidth per carrier frequency is not changed compared to the known two-step GMSK modulation.

Proceeding from a "half rate" transmission, for example given improved voice encoding, and analogous switch given good transmission quality is made from a "half rate" transmission channel to a burst quarter rate transmission channel to be defined with 4-step phase modulation that only occupies every $32^{nd}$ time slot on average and therefore allows four times the number of transmission channels compared to a "full rate" transmission channel.

A 4-step phase modulation is fashioned such that respectively two neighboring bits in a bit stream ... $d_{i-1}$, $d_i$, $d_{i+1}$ ... to be transmitted, for example $d_i$ and $d_{i+1}$, are combined to form a symbol $w_n$ with n=½, whereby an allocation recited in the following Table applies:

| $w_n$ | $d_i$ | $d_{i+1}$ |
|---|---|---|
| 0 | 0 | 0 |
| 1 | 0 | 1 |
| 2 | 1 | 0 |
| 3 | 1 | 1 | whereby modulation of the phase $(\phi_0 + \Sigma_n(k_n \phi(t-nT)))$ ensues with $k_n = 1 - \frac{2}{3}(w_n - w_{n-1}$ modulo 4), whereby $$\phi(t-nT) = \int_{-\infty}^{t-nT} \int_{-\infty}^{t'} \frac{\pi}{2T} \cdot \frac{1}{\sqrt{2\pi}\,b}\left(\exp\left(\frac{t''}{2b^2}\right) - \exp\left(-\frac{(t''-T)^2}{2b^2}\right)\right) dt'' dt'$$

with $b = \sqrt{\ln 2} / (2\pi \cdot B)$ is a Gaussian ramp of 0 on π/2 with BT=0.3 as in the 2-step GMSK modulation, whereby B references the bandwidth and T references the duration of a symbol $w_n$.

In the method for the modulation of a modulation carrier according to the invention, the transmission quality is respectively constantly monitored at the reception side both given a transmission from a mobile station to a base station, what is referred to as the uplink, as well as given a transmission from a base station to a mobile station, what is referred to as the downlink, given employment, for example, in the framework of a mobile communication system. Given an adequate transmission quality, the transmission mode is modified. The receiver respectively initiates the modification of the transmission mode and informs the sender of this via a signaling channel that is usually present.

Such a modification of the transmission mode is inventively undertaken in such a way that fewer time slots per time unit are employed on average for that channel that has an adequate transmission quality. So that same average data rate is thereby respectively retained, the number of steps of the respective modulation method is inventively incremented.

The incrementation of the number of steps of the modulation method is thereby undertaken such that the spectral width of the channel does not increase. The channel spacing in frequency-division multiples thus also remains unchanged. Since fewer time slots per channel are required on average according to the invention, the plurality of connections (channels) that can be transmitted over the radio interface, for example for a mobile communication system, can be increased given the same frequency spectrum.

When, by contrast, the transmission quality in a channel drops, then the number of steps of the modulation method is correspondingly reduced in turn or an increase in the transmission power is initiated.

The adaptation of the number of steps can be especially easily converted when the set of the steps of a number of steps forms a sub-set of the next highest number of steps.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

In the ideal code-division multiple access method (CDMA), every channel is received with a relatively poor signal-to-noise ration (C/I+N)=Carrier/Interferer+Noise) beginning from a moderate load, i.e. when about half of the channels are used. Such a signal-to-noise ratio, however, is generally adequate for the required bit error probability.

Given combined time-division multiplex/frequency-division multiples access methods (TDMA/FDMA), however, it can occur that reception over some channels occurs with a good—and, thus, far too high–signal-to-noise ratio even given a high load, i.e. when nearly all available channels are used. This good quality of a reception signal, however, can generally hardly be used for enhancing the channel capacity since the required bit error probability was already achieved.

An approach to the maximum channel capacity requires the introduction of a multi-step coding or, respectively, of a multi-step modulation or, on the other, the increase of the number of steps. A modulation with a number of steps adaptively selected according to the respective transmission quality can be integrated such given networks employing time-division multiplex/frequency-division multiplex access methods that the predetermined or, respectively, existing time and frequency grids are retained. According to the invention, thus, the bandwidth utilization can fundamentally be brought very close to a theoretically achievable bandwidth utilization in time-division multiplex/frequency-division multiplex networks.

As a preferred applied example, an improvement of the bandwidth utilization in the GSM (global system for mobile communication) mobile radiotelephone system is described in greater detail below. A person skilled in the art is familiar with the GSM mobile radiotelephone system from, for example, J. Biala, "Mobilfunk und intelligente Netze", Vieweg Verlag, Brauschweig/Wiesbaden, 1995.

Figure 1:
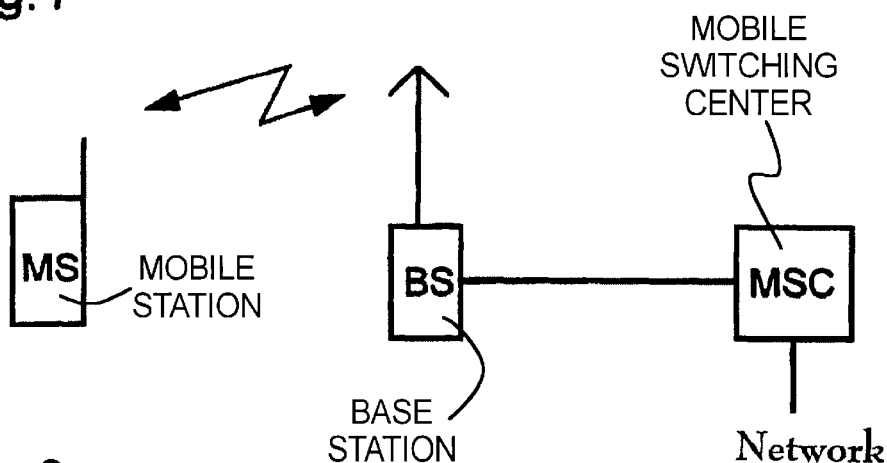
FIG. 1 depicts a mobile communication system.

FIG. 1 shows a mobile communication system, for example according to the GSM standard, that comprises a mobile station MS, a base station MS and a mobile switching center MSC by way of example. The mobile station MS and the base station BS are connected to one another via a radio interface, whereas the connection between base station BS and mobile switching center is wire-bound. The mobile switching center MSC represents the transition to further networks.

Figure 2:
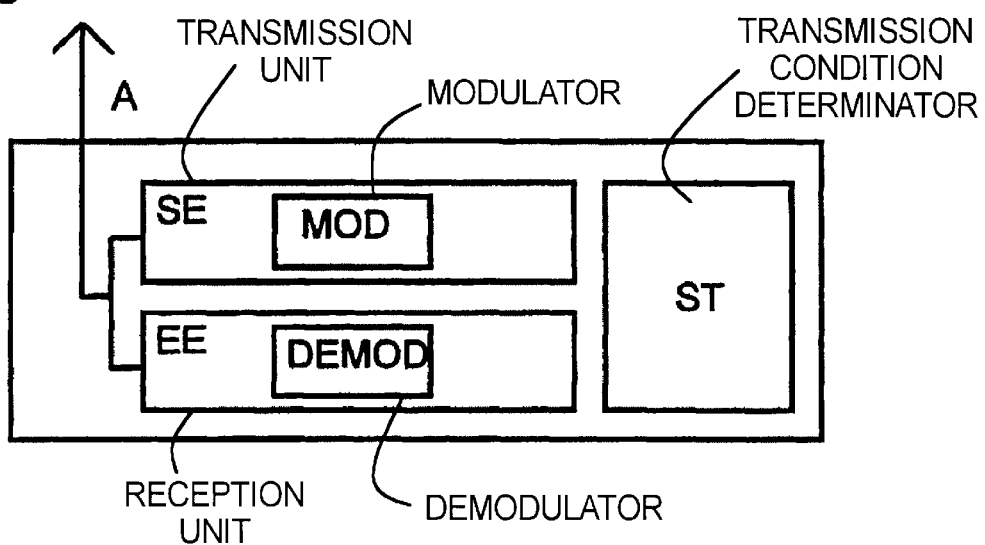
FIG. 2 depicts a transmission/reception station of a mobile communication system.

A transmission/reception station according to FIG. 2, represented, for example, by a mobile station MS or a base station BS, comprises an antenna A and at least one transmission unit SE and one reception unit EE. Further, means ST for determining the transmission conditions on the radio interface are provided. Further means for the configuration of such a transmission/reception station are well-known to a person skilled in the art.

The transmission unit SE and the reception unit EE are designed for a time-division multiplex access method by a time separation of the transmission channels and comprise a modulator MOD or, respectively, a demodulation DEMOD, that realize a form of modulation that is variable in view of its number of steps.

As was already explained above, the transmission quality is respectively monitored at the reception side given a transmission from a mobile station MS to a base station BS, what is referred to as the uplink, as well as given a transmission from a base station BS to a mobile station MS, what is referred to as the downlink, whereby every $8^{th}$ time slot is usually employed. Given adequate transmission quality, the transmission is switched to a "burst half rate" useful channel (traffic channel=TCH/BH) defined in detail below.

Such a "burst half rate" channel is advantageously distinguished in that only every $16^{th}$ time slot is used in the radio interface on average, as, for instance, in a "half rate" traffic channel (TCH/H). The payload data rate of a "burst half rate" traffic channel thereby corresponds to the payload data rate of a "full rate" traffic channel (TCH/F).

Such a payload data rate is achieved in a "burst half rate" traffic channel by a 4-step payload data phase modulation in the TCH/BH burst that, for example, is derived from the known GMSK (Gaussian minimum shift keying) modulation. The training sequence that is usually provided is thereby sent completely unmodified, so that the correlator previously utilized in the GMSK modulation can continue to be employed. Further, the 4-step phase modulation of the TCH/BH burst is implemented such that the bandwidth occupied per carrier frequency does not change compared to the two-step GMSK phase modulation. This means that the introduced and existing FDMA frequency grid can continue to be employed without any modifications whatsoever.

By using the TDMA method, thus, transmission given the same bandwidth can be carried out on two "burst half rate" traffic channels (TCH/BH) instead of on one "full rate" traffic channel. Given good transmission conditions, thus, a doubling of the capacity is possible according to the invention without requiring additional bandwidth. However, the demands with respect to the signal-to-noise ration (C/(I+N) are higher in a "burst half rate" payload channel TCH/BH), with the result that a switch must be made back to a "full rate" traffic channel TCH/F) given deteriorating signal-to-noise ratio.

In order to be able to switch to the "burst half rate" traffic channel (TCH/BH) as often as possible, a higher transmission power may be required. With respect to the battery life in a mobile station, the required power—which must be higher by the factor 2—is compensated by a more seldom appearance of bursts.

When one can already proceed from a "half rate" communication, for example given the presence of an improved voice encoding, a switch can be analogously made from a "burst half rate" traffic channel TCH/BH) with good transmission quality to a "burst quarter rate" traffic channel (TCH/BQ)—yet to be defined in detail—with a 4-step phase modulation. In this case, only every $32^{nd}$ time slot is then occupied on average; a four-fold number of channels is thus achieved compared to a "full rate" traffic channel (FCH/F).

A possible realization of a 4-step phase modulation for the GSM mobile radiotelephone system is recited below. Respectively two neighboring bits in a bit stream ... $d_{i-1}$, $d_i$, $d_{i+1}$ ... to be transmitted, for example $d_i$ and $d_{i+1}$, are combined to form a symbol $w_n$ with n=I/2, whereby the allocation to be seen from the Table applies.

A modulation of the phase $(\phi_0+\Sigma_n(k_n\phi(t-nT))$ ensues with $k_n=1\frac{2}{3}(w_n-w_{n-1}$ modulo 4), whereby $$\phi(t-nT) = \int_{-\infty}^{t-nT}\int_{-\infty}^{t'}\frac{\pi}{2T}\cdot\frac{1}{\sqrt{2\pi}\,b}\left(\exp\left(\frac{t''}{2b^2}\right)-\exp\left(-\frac{(t''-T)^2}{2b^2}\right)\right)dt''dt$$

with $b = \sqrt{\ln 2}\,/\,(2\pi\cdot B)$ is a Gaussian ramp of 0 on π/2 with BT=0.3 as in the 2-step GMSK modulation, whereby B references the bandwidth and T references the duration of a symbol $w_n$. For the special case of $d_i=d_{i+1}$ (for all n with I=2n), the modulation specified here corresponds exactly to the GMSK modulation as currently employed in the GSM mobile radiotelephone system.

Compared to the 2-step GMSK modulation, all other cases lead to slighter phase modifications and therefore do not increase the bandwidth of the phase-modulated signal. The FDMA structure of the GSM band is thus also not negatively affected.

In order to due justice to the stricter demands with respect to the signal-to-noise ratio (C(I+N) given greater numbers of steps of the digital transmission channel, the transmission power can also be increased together with the number of steps, insofar as other boundary conditions allow this. The transmission power can be increased particularly at the mobile station without shortening the service life since the frequency of occurrence of the time slots employed decreases.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for modulating a modulation carrier, comprising the steps of:

providing a modulation form that is variable in view of a number of steps thereof for a digital transmission channel;

the adaptively matching the number of steps of the modulation during operation to existing transmission conditions;

a set of the steps in a modulation with a specific number of steps being a sub-set of the set of steps with the next-higher number of steps.

2. The method according to claim 1, wherein a training sequence that does not change in adaptation of the number of steps is transmitted in the digital transmission channel.

3. The method according to claim 2, wherein a substantially constant error probability is achieved by the adaptation of the number of steps in this transmission channel.

4. The method according to claim 1, wherein a time-division multiplex time slot is allocated to a plurality of transmission channels; and wherein the adaptation of the number of steps of the modulation carrier of a transmission channel matched to the transmission conditions are linked with a modification of transmission time resources of said transmission channel that are made use of such that a data transmission rate of said transmission channel remains essentially constant.

5. The method according to claim 4, wherein the allocation of time slots to transmission channels matched to the transmission conditions is based on a high plurality of transmission channels.

6. The method according to claim 1, wherein a form of modulation variable in view of its number of steps is determined such that a set of modulated modulation carriers of all possible signals is a sub-set of a set with the next higher number of steps given modulation with a specific number of steps.

7. A mobile communication system for signal transmission over a radio interface between a base station and a mobile station that respectively have at least a modulator and a demodulator, upon employment of a multi-step modulation of a modulation carrier, comprising:

device for determining transmission conditions in at least one of the base station and the mobile station;

a form of modulation variable in view of a number of steps thereof provided by the modulator and the demodulator; the modulator and the demodulator being structured the number of steps of the modulation in the respective digital transmission channel on the radio interface are adaptively matched to the transmission conditions respectively present during operation; and the modulator being structured such that a set of the steps in a modulation with a specific number of steps is a sub-set of the set of steps with the next-higher number of steps.

8. The mobile communication system according to claim 7, wherein with modification of the number of steps in the respective transmission channel, a substantially constant error probability that is identifiable by the device for determining the transmission conditions being achieved by the modulator and by the demodulator.

9. The mobile communication system according to claim 7, wherein the radio interface is structured according to at least one of a time-division multiplex method and a combined time-division multiplex/frequency-division multiplex method.

10. The mobile communication system according to claim 7, wherein the adaptation of the number of steps of the modulation carrier of a transmission channel matched to the transmission conditions by the modulator and by the demodulator are linked with a modification of transmission time resources of said transmission channel that are made use of such that a data transmission rate of said transmission channel remains substantially constant.

11. The mobile communication system according to claim 7, wherein allocation of time slots to transmission channels matched to the transmission conditions is based on a high plurality of transmission channels.

12. The mobile communication system according to claim 7, wherein a form of modulation variable in view of a number of steps thereof is determined such that a spectral width of the transmission channel is not enlarged given modification of the number of steps.

13. The mobile communication system according to claim 7, wherein a modification of the number of steps of the modulation of the respective digital transmission channel is linked with a modification of the transmission power and is monitored such by the device for determining the transmission conditions such that an adequate signal-to-noise ratio given a high number of steps can be achieved by a higher transmission power.

14. The mobile communication system according to claim 7, wherein the system is a GSM mobile radiotelephone system, whereby, for improving bandwidth utilization:

transmission quality is monitored at a reception side given a transmission between a mobile station and a base station; and, given determination of an adequate transmission quality, a switch is made from the of a "full rate" traffic channel to a "burst half rate" traffic channel wherein, analogous to a "half rate" traffic channel, one-half the time slots is used on average, and a payload data correspond to those of a "full rate" traffic channel due to provision of a 4-step phase modulation instead of a 2-step phase modulation.

15. The mobile communication system according to claim 14, wherein the 4-step phase modulation in the "burst half rate" traffic channel is structured such that the occupied bandwidth per carrier frequency is not changed compared to the known two-step GMSK modulation.

16. The mobile communication system according to claim 14, wherein proceeding from a "half rate" transmission, an analogous switch given good transmission quality is made from a "half rate" transmission channel to a burst quarter rate transmission channel to be defined with 4-step phase modulation that only occupies every $32^{nd}$ time slot on average and therefore allows four times the number of transmission channels compared to a "full rate" transmission channel.

* * * * *